US006975981B1

(12) United States Patent
Soloviev

(10) Patent No.: US 6,975,981 B1
(45) Date of Patent: Dec. 13, 2005

(54) METHOD FOR COMMUNICATION WITH REAL-TIME REMOTE DEVICES OVER WIDE-AREA COMMUNICATIONS NETWORKS

(75) Inventor: Dmitri Soloviev, Santa Clara, CA (US)

(73) Assignee: Networkfab Corporation, Santa Clara, CA (US)

( * ) Notice: Subject to any disclaimer, the term of this patent is extended or adjusted under 35 U.S.C. 154(b) by 911 days.

(21) Appl. No.: 09/611,793

(22) Filed: Jul. 7, 2000

(51) Int. Cl.[7] .............................................. G06F 9/455
(52) U.S. Cl. .................. 703/27; 709/225; 370/395.53; 703/24
(58) Field of Search ............................... 703/13, 6, 24, 703/27; 715/513; 709/203, 246, 318, 225

(56) References Cited

U.S. PATENT DOCUMENTS

| 6,546,424 B1 * | 4/2003 | Cucchiara ..................... 709/226 |
| 6,614,792 B1 * | 9/2003 | Pazy et al. ............. 370/395.53 |
| 6,738,815 B1 * | 5/2004 | Willis et al. ................ 709/225 |
| 6,741,558 B1 * | 5/2004 | Gresham .................... 370/230 |
| 6,757,869 B1 * | 6/2004 | Li et al. ...................... 715/513 |

OTHER PUBLICATIONS

Corcoran et al., P.M. A Remote Electronic Object Emulation System for Home Bus Applications, IEEE Transactions on Consumer Electronics, vol. 40, Iss. 3, Aug. 1994, pp. 405-410.*

* cited by examiner

Primary Examiner—Russell Frejd
(74) Attorney, Agent, or Firm—Steins & Associates, P.C.

(57) ABSTRACT

An Improved Method for Communication with Real-time Remote Devices over Wide-area Communications Networks is disclosed. Also disclosed is a method and system that provides the remote device with local (non-networked) control for Time-Dependent-Responses, while limiting those communications transmitted over the network to those of the Non-Time-Dependent type. The method and device provide a local emulation of the controlling computer to the remote device, and a local emulation of the remote device to the controlling computer and any other devices monitoring the remote device. The emulations may be provided within either the computer and device themselves (as software), or within discrete, stand-alone devices ("remoting devices"). The emulations can compensate for communications delays and or errors by maintaining a calculated image of the remote device or controlling computer.

13 Claims, 8 Drawing Sheets

METHOD FOR COMMUNICATION WITH REAL-TIME REMOTE DEVICES OVER WIDE-AREA COMMUNICATIONS NETWORKS

BACKGROUND OF THE INVENTION

1. Field of the Invention

This invention relates generally to network communications and, more specifically, to an Improved Method for Communication with Real-time Remote Devices over Wide-area Communications Networks.

2. Description of Related Art

It is a common arrangement today and not limited to the manufacturing environment, for a central computing device to control physically remote devices via network communication conduits. In this arrangement, it is possible for a centralized control station to track, monitor and control a series of remote machines or devices. Many times, this arrangement works very well. If we turn to FIG. 1 we can examine how one example of this arrangement might function under the conventional method.

FIG. 1 depicts the conventional communication sequence between the computer and a remote computer-controlled device. As can be seen in FIG. 1, a Computer 10 is in communication with a Device 12, in this case, a machine for placing stickers on Boxes 14 as they are carried through the Device 12 by a Conveyor 16. The Computer 10 communicates with the Device 12 over a Network Conduit 18 to which the Computer 10 and Device 12 are each connected via Network Cables 20. It should be understood that the Network Conduit 18 might be a local area network, but might also be a wide area network. Below the depiction, a series of conventional commands and responses are shown. If the Computer 10 issues Command 100, directing the Device 12 to alert the Computer 10 when a Box 14 is in the proper position, it can be seen that once the box is in Position 102, the Device 12 will issue the Message 104 that a box is now in position. In response, the computer would be expected to issue Command 106 for the Device 12 to apply the sticker and then inform the Computer 10 once the sticker has been applied. Upon receipt of this command, the Device 12 applies the Sticker 108 and then issues the Message 110 that the Sticker 22 has been applied. This method works very well only if we assume that the functioning of the device 12 does not depend on the timely arrival of the commands from the Computer 10. It should be understood that if there is a significant delay between the occurrence of step 102 when the box is in position and the receipt of Command 106 to apply the Sticker 108, the Device 12 might apply the Sticker 22 in the wrong place on the Box 14. Furthermore, the Sticker 22 might not be applied to the Box 14 at all.

As can be seen, and as noted in FIG. 1, the Command 100 is a non-time-dependent message (NTDM). We classify it as such, because the Device 12 does not depend upon the content of this message for its proper operation. Furthermore, the Device 12 Message 110 that the sticker is applied is also a non-time-dependent message since it is simply recording the status. It should be seen however, that Commands 104 and 106 are time-dependent (TDM). We classify these messages and commands as TDM's because, should there be a delay in their transmittal over the Network Conduit 18, the operations of the Device 12 may be severely effected.

It should be understood that most modern networks have a non-deterministic nature and therefore do not allow the devices connected to it to predict an exact delay. As such, it should be noticed that any receipt of a transmitted message over a network actually contains two general delay components. These components are an average network delay, which typically is relatively constant, and is a function of the performance specifications of the network conduit, and communications hardware and software of the computer and device. Since the average network delay is relatively constant, it can be compensated for by simply setting the Device 12 to take the delay into account.

The other component of communications delay is not as easy to manage. This component is known as random network delay, and is typically associated with random delays between data packets being sent between network devices. In the case of random network delays, there truly is little predictability, since they are caused by network productivity issues, spurious delays, or loading issues, among others. To solve this problem, what is necessary is to reallocate or redistribute the decision-making process between the Computer 10 and the Device 12. If we look at FIG. 2, we can examine how this might be done.

FIG. 2 is the depiction of the system of FIG. 1 operating under the improved method of the present invention. As can be seen in FIG. 2, the initial command from the Computer 10, 112 is for Device 12 to apply a sticker to a box that has been positioned and then inform the Computer 10 once this has been completed. In response, once the box is in Position 102, the Device 12 applies a Sticker 108 and then issues the Non-Time-dependent Message 110, that the sticker has been applied. By redistributing this decision making process, it can be seen that both Messages 110 and 112 are non-time-dependent, and therefore network delays would not effect the operations of the Device 12. If we now turn to FIG. 3, we can study how the logic system for the control system of FIG. 1 is arranged.

FIG. 3 is a depiction of the conventional driver systems of the computer and device of FIGS. 1 and 2. As can be seen here, within the Computer 10 and as it applies to the Device 12, one will find a Computer Resident Device Driver System 24. Similarly, within the Device 12, there will be contained a Device Resident Driver System 26. Within the Computer Resident Device Driver System 24, among other things, will be found a series of Non-Time-dependent Commands 28 and Time-dependent Commands 30, as discussed above in connection with FIGS. 1 and 2. Similarly, with the Device Resident Driver System 26, there will be found a series of Non-Time-dependent Responses 32 as well as Time Dependent Responses 34. What is needed is a system depicted by FIG. 4, discussed below.

SUMMARY OF THE INVENTION

In light of the aforementioned problems associated with the prior devices, systems and methods it is an object of the present invention to provide an Improved Method for Communication with Real-time Remote Devices over Wide-area Communications Networks. It is a further object that the method and system provide the remote device with local control for Time-Dependent-Responses, while limiting those communications transmitted over the network to those of the Non-Time-Dependent type. It is still a further object that the method and device provide a local emulation of the controlling computer to the remote device, and a local emulation of the remote device to the controlling computer and any other devices monitoring the remote device. It is yet another object that these emulations be provided within either the computer and device themselves (as software), or within discrete, stand-alone devices ("remoting devices"). It is still another object that these emulations compensate for communications delays and or errors by maintaining a calculated image of the remote device or controlling computer.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Improved Method for Communication with Real-time Remote Devices over Wide-area Communications Networks.

Figure 4:
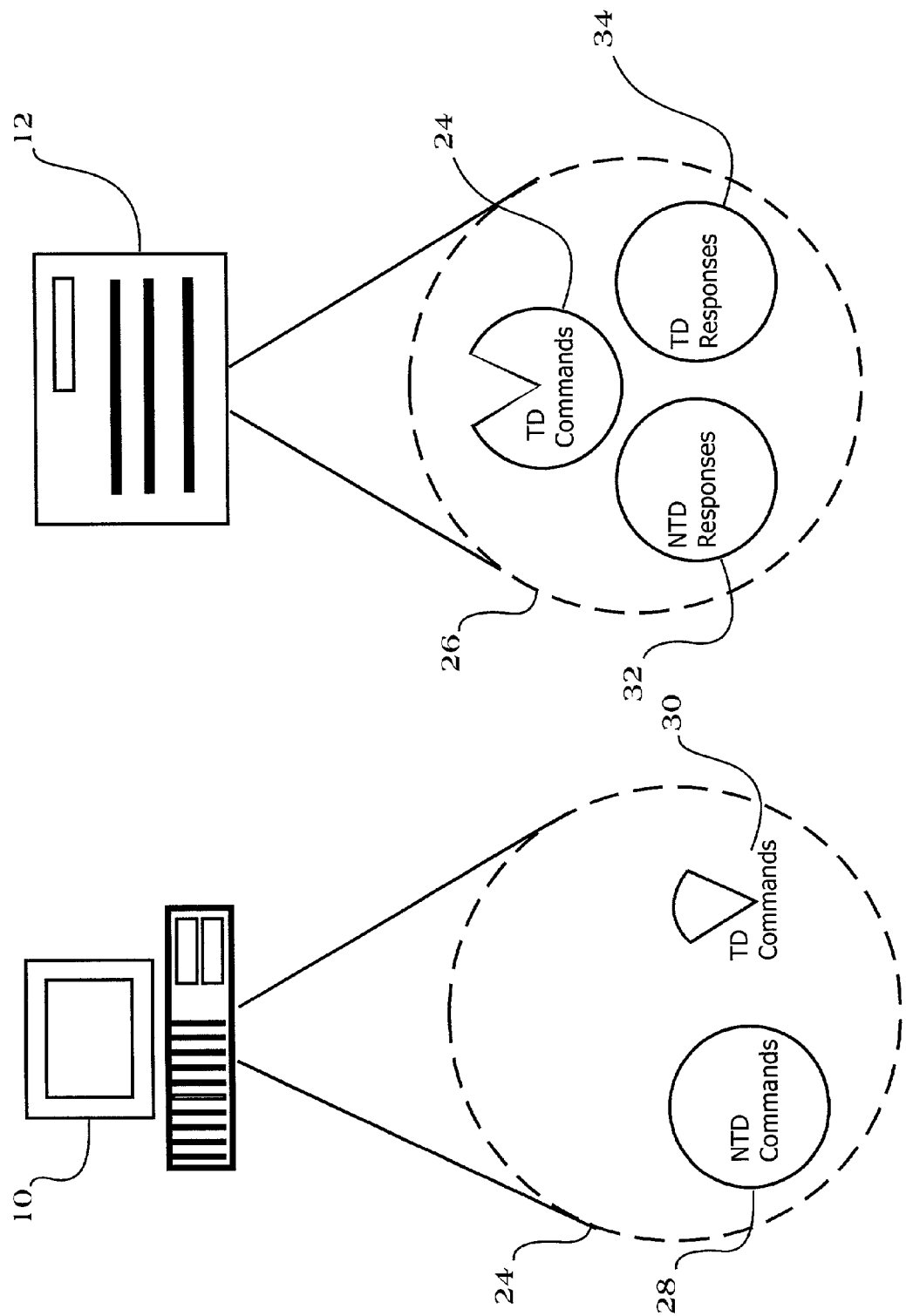
FIG. 4 depicts the improved device driver systems of the present invention.

The present invention can best be understood by initial consideration of FIG. 4. FIG. 4 depicts the improved device driver systems of the present invention. As can be seen in FIG. 4, the Time Dependent Commands 30 of the Computer Resident Device Driver System 24, have been partially transferred to the Device Resident Driver System 26. In such a manner, the Device 12 will be capable of issuing Time Dependent Commands and thereafter, performing Time Dependent Responses 34 without being effected by network delays. If we now turn to FIG. 5, we can begin to explore the present invention in more detail.

Figure 5:
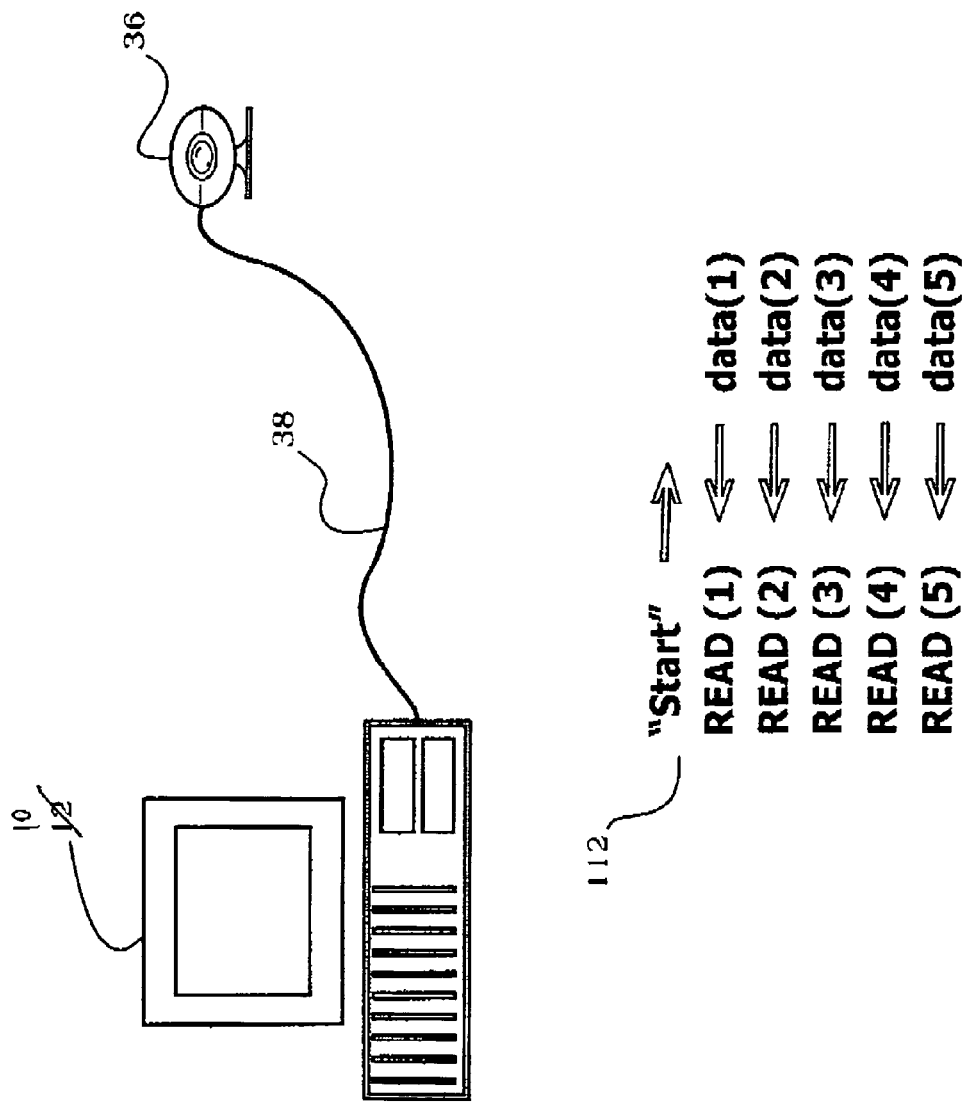
FIG. 5 depicts a conventional communications sequence between a computer and a direct-connect device.

FIG. 5 depicts a conventional communications sequence between a computer and a direct-connect device. As can be seen here, Computer 10 is connected to a conventional Direct Connect Device 36 (in this case, a digital video camera). The Direct Connect Device 36, is configured to communicate with the Computer 10 by a Direct Conduit 38, such as a USB cable connection. When connected directly as shown, Computer 10 uses Command 112 for Device 36 to start sending data. In response, the Device 36 begins transmitting data packages, for example, data packages one through 5 over the Direct Conduit 38. In order to correctly display the data packages, Computer 10 must issue read commands for each data package. In the depicted arrangement, the system works very well since a direct connection will result in virtually no delay, and the arrival of the data packages is therefore very predictable. If we now turn to FIG. 6, however, we can see what typically occurs when a Direct Connect Device 36 is connected to a Computer 10 over a Network Conduit 18, as might be desired.

Figure 6:
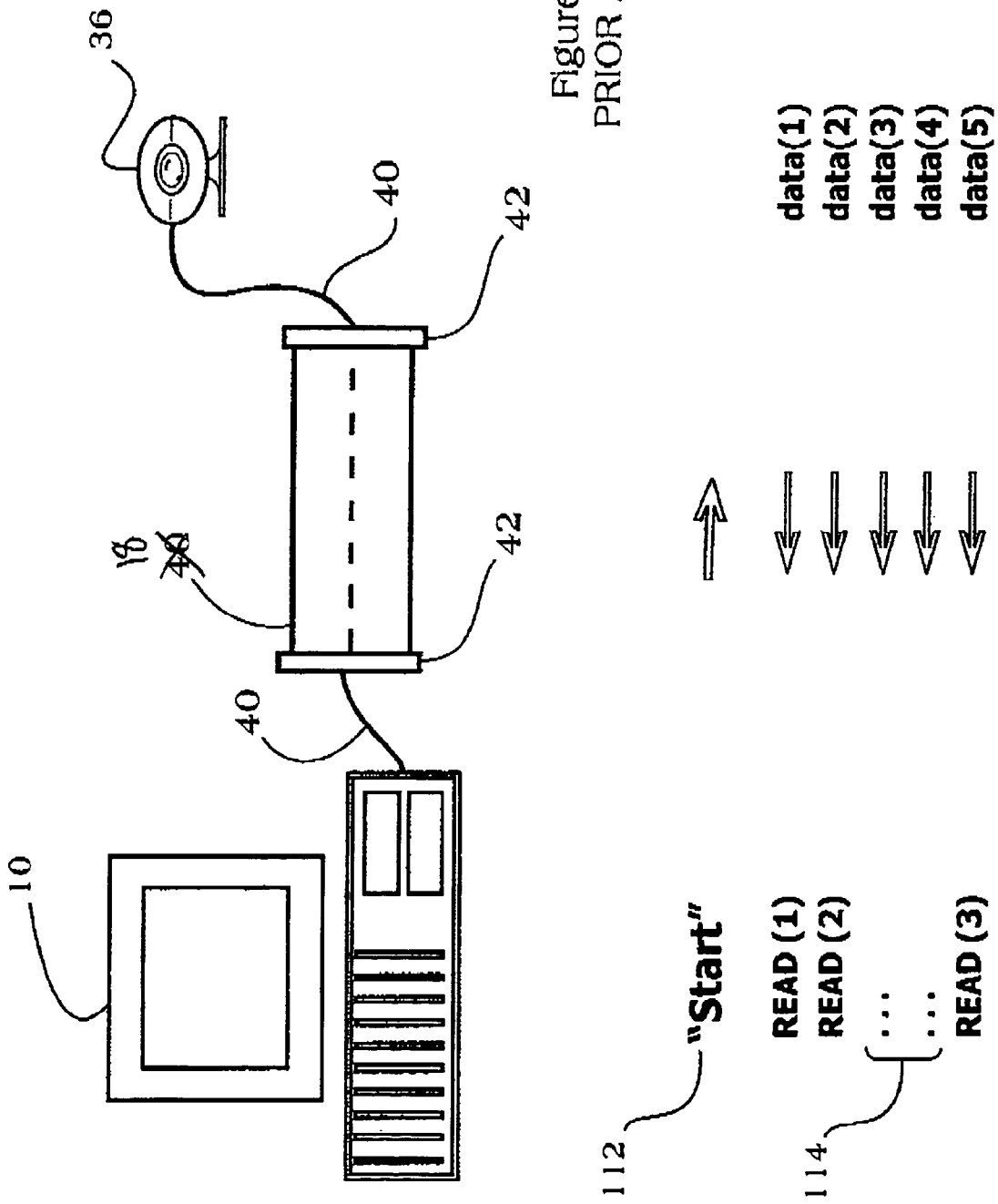
FIG. 6 depicts the communications sequence between a conventional computer and a direct-connect device in communication over a network conduit.

FIG. 6 depicts the communications sequence between a conventional computer and a direct-connect device in communication over a network conduit. Computer 10 and Direct Connect Device 36 are connected to the Conduit 18 via Network Cables 40 and Network Portals 42. The problem with this arrangement is depicted below the drawing. As can be seen, the Computer 10 issues a Command 112 for the Device 36 to start sending data. In response, the Device 36 begins sending data packages as shown. At the appropriate time, the Computer 10 issues the appropriate read request in time to receive each data package. In this case however, if a Delay 114 occurs in receipt of the data packages, the Read Request 3 will no longer be timed correctly with the arriving data packages. As a result, the displayed video at the Computer 10 will be broken, choppy, and generally undesirable. If we turn to FIG. 7, we can see how the method and system of the present invention will alleviate this problem.

Figure 1:
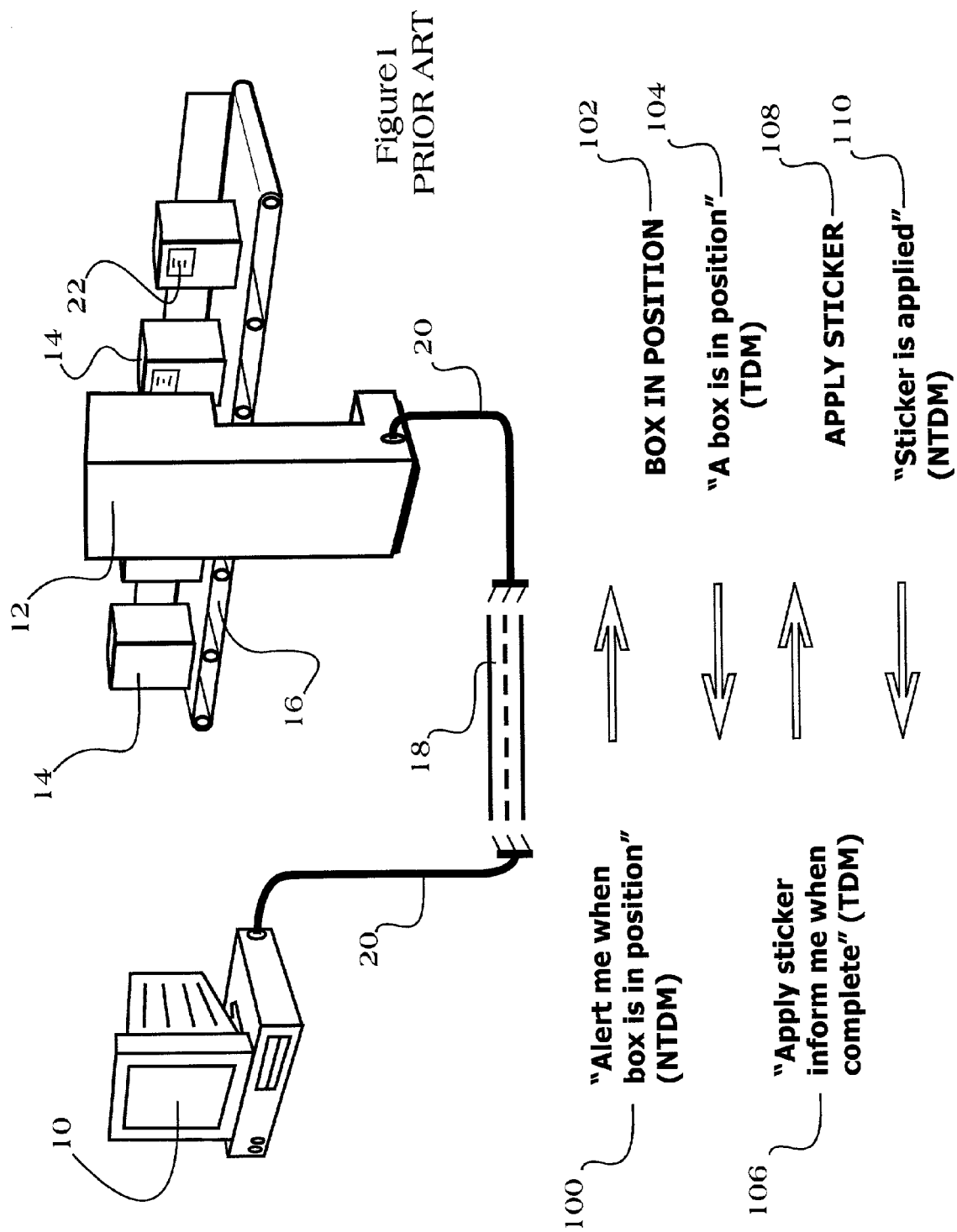
FIG. 1 depicts the conventional communication sequence between the computer and a remote computer controlled device.
Figure 2:
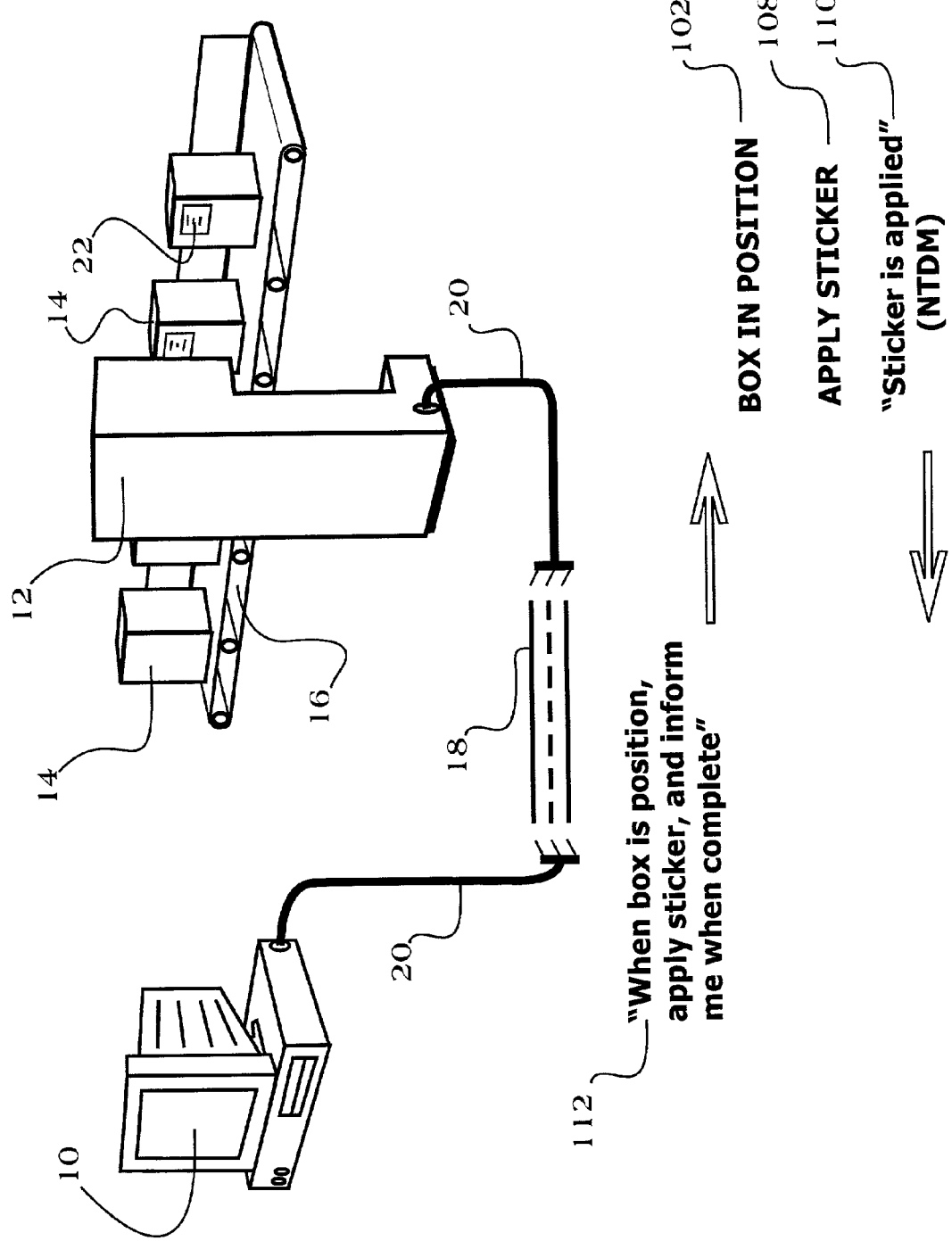
FIG. 2 is the depiction of the system of FIG. 1 operating under the improved method of the present invention.
Figure 3:
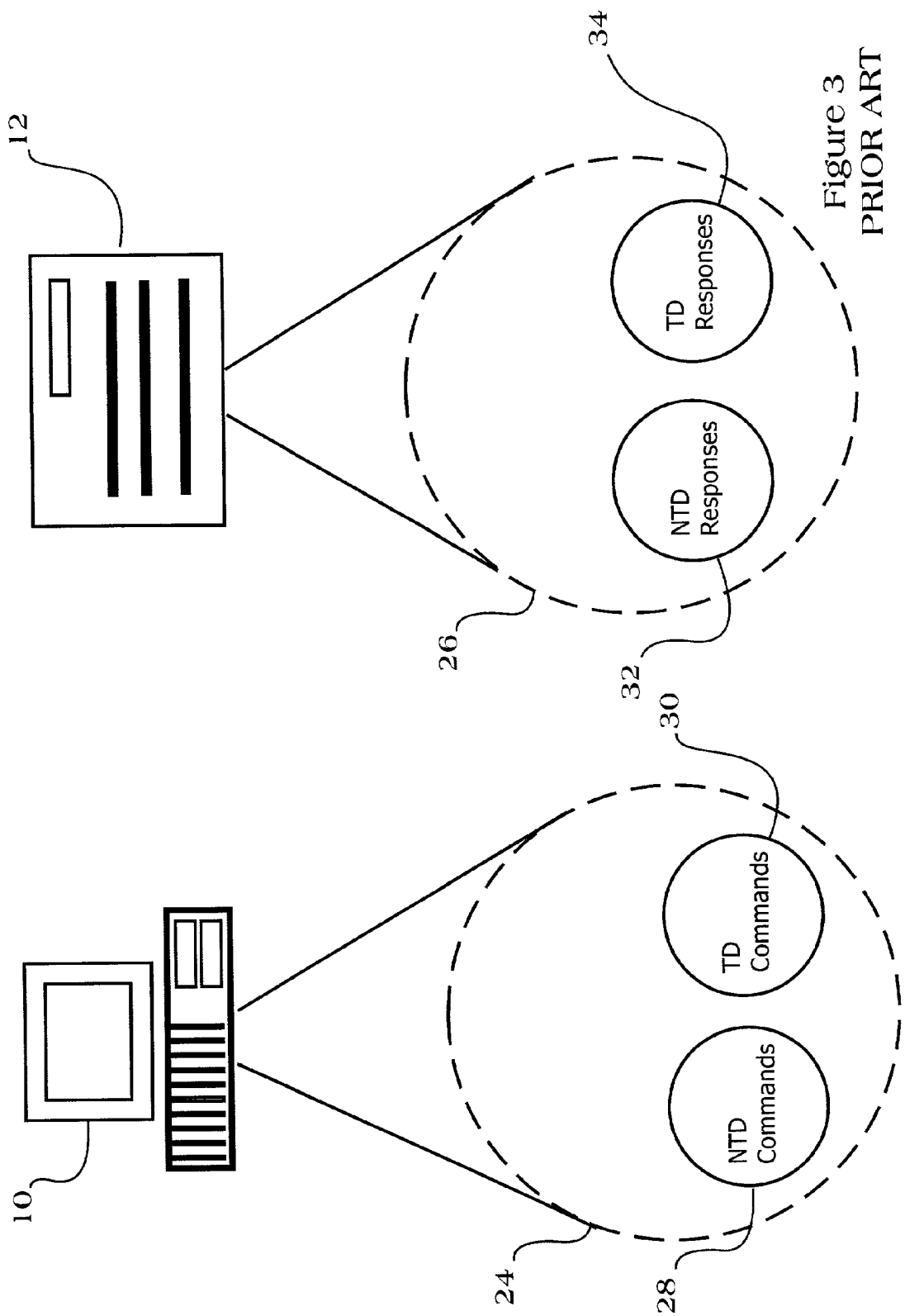
FIG. 3 is a depiction of the conventional driver systems of the computer and device of FIGS. 1 and 2.
Figure 7:
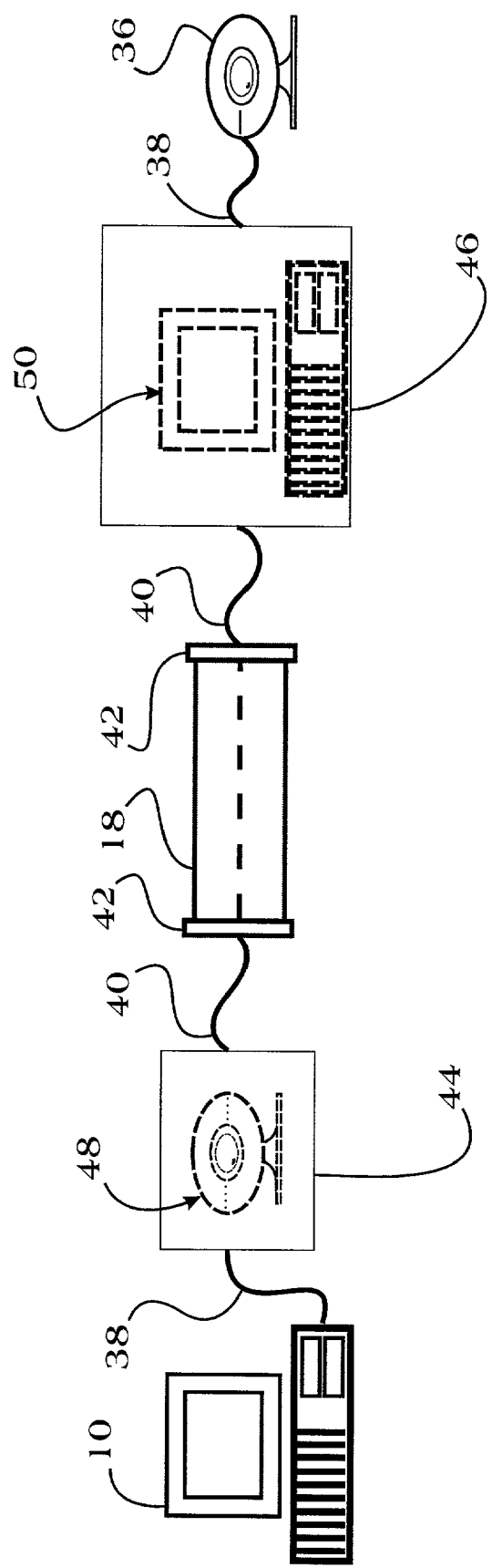
FIG. 7 depicts the system of FIG. 6 further including the remoting system devices of the present invention.

FIG. 7 depicts the system of FIG. 6, further including the remoting system devices of the present invention. As can be seen in FIG. 7, the Computer 10 and Direct Connect Device 36 each now attach to the conduit 18 through the Remoting Systems. In particular, Computer 10 connects to a Computer Connected Remoting System (CCRS) 44, by a Direct Conduit 38 such as a USB cable (or even wireless means), after which the CCRS 44 attaches to the network conduit 18 via Network Cable 40 and Portal 42. Similarly, the Device 36 is connected by Direct Conduit 38 to a Device Connected Remoting Systems (DCRS) 46. The DCRS 46 is then connected to the Conduit 18 via Network Portal 42 and Cable 40. Each Remoting System 44 and 46 provide an emulation of the remote device to the device connected directly to the Remoting Systems 44 and 46. Specifically, the CCRS 44 has an emulation of the Device 36. This Device Emulation 48 provides a constant presentation to the Computer 10 of the input from the Device 36. In the event that data errors or delays occur, Device Emulation 48 will maintain a display (from the computer's perspective) of its previous data, such that the Computer 10 will be unaware of any problem. Similarly, the DCRS 46 provides the emulation of Computer 10 to the Remote Device 36. This Computer Emulation 50 acts in a way to ensure that any time dependent messages are issued by the Emulation 50 that is resident within the DCRS 46, rather than having the requirement for these TDM's to be transmitted from the Computer 10 over the Conduit 18 to the Device 36. In its simple form, this is depicted above in the discussion made in connection with FIG. 2.

In order to remain transparent to the Computer 10, the CCRS 44 will translate the device state changes that the DCRS 46 sends over the network and will apply those state changes to the Device Emulation 48. Thereafter, all data sent to the Device 36 will be "executed" locally by the Emulation 48. At the same time, if the update needs to be sent to the actual Device 36, the CCRS 44 will generate the appropriate message (in response to command by the Computer 10) that will then appear to emanate from the Computer Emulation 50, enabling very quick response times when necessary. The result of the inclusion of these remoting systems is depicted by FIG. 8.

Figure 8:
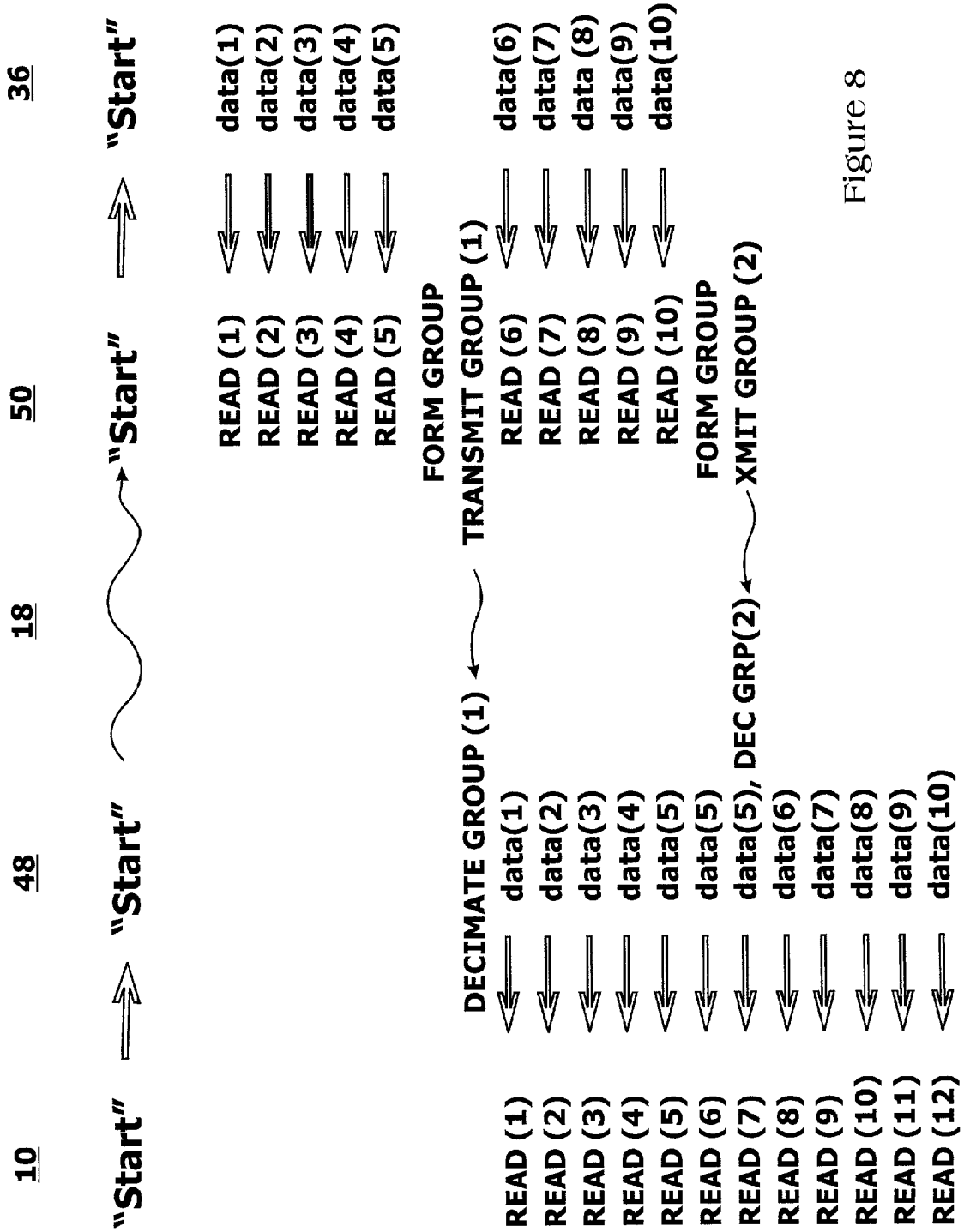
FIG. 8 depiction of the improved communication method of the present invention.

FIG. 8 depicts a theoretical communication sequence between the Computer 10 and Remote Device 36 of FIGS. 6 and 7, as the process might unfold with the inclusion of the preferred remoting devices of the present invention. Again here, a "Start" command is given by the Computer 10, which is transmitted by the CCRS 44 over the Network Conduit 18 to the DCRS 46. The DCRS applies the command to the Computer Emulation 50, such that, from the Remote Device's 36 perspective, the "Start" command is generated by the Emulation 50.

In response, the Remote Device 36 begins sending data to the Computer Emulation 50 (e.g. data(1)–(5)). At this point, the DCRS 46 forms this data into a group, and then packages or converts it in some way (such as encryption, compression, adding authentication watermarks, etc.) and transmits it to the CCRS 44. The CCRS 44 processes the data group (i.e. explodes, decrypts, authenticates it, etc.), and applies the data to the Device Emulation 48. The CCRS 44 then begins sending data(1)–(5) to the Computer 10 (to the Computer 10, it appears to originate at the Emulation 48).

The Computer 10 generates read requests as the data arrives, just as with the direct-connect arrangement shown above in FIG. 6. The difference here, is significant, however—when there is a delay in receiving data after data(5) has been transmitted from the Device Emulation 48 to the Computer 10, the Device Emulation 48 will continue to generate copies of the last data transmitted (here that is data(5)), until new data has been received and processed by the CCRS 44. Furthermore, other ways of "filling the holes" in received data might be employed by the system and method, such as creating an emulation that is based on a predicted or calculated state, or even some pre-set "home" state, among others; in any event, the created Emulation 48 might be more than just a simple copy of the last "good" data. Since the Computer 10 has "seen" no break in data flow, there are no interruptions, breaks or other visibly erratic behavior with the display of the received data. Essentially, the CCRS 44 has "smoothed out" the signal.

In this improved model, performance of the network only affects the speed of "synchronization" between the Device Emulation 48 and the Device 36 itself, and between the Computer Emulation 50 and the Computer 10 itself. In the event that communications quality becomes degraded, the Emulations 48 and 50 will simply be updated less often (which will be transparent to the connected Device 36 or Computer 10, respectively).

Another benefit of communicating with the Device 36 and Computer 10 through the Remoting Systems 44 and 46, is the ability to distribute parts of the driver set to the Computer 10 and Remote Device 36 respective Emulations 46 and 44. Specifically, many TDM's can be transferred to the Emulations (rather than the Computer or Remote Device), such that the benefits discussed above in connection with FIG. 2 will be obtained, namely the reduction of the impact of random network delays on the remote operation of the Remote Device 36. In such a scenario, the CCRS 44 will send only asynchronous, non-time-dependent commands to the CDRS 46 (and therefore the Remote Device 36), along with instructions on how to react in the event that a time-dependent event occurs.

Other benefits include: reducing the bandwidth of the transmitted data by compressing the data at the DCRS 46 (can optimize transfer speed); dynamic adjustment in compression type and format in response to detected network delays and stability (the Remoting Systems will be able to detect changes, can communicate them to one another, and then responsively adjust); and the compression can be application-specific—certain compression types might be chosen responsively to the nature of the content being transmitted by a particular software application. Still further, there is opportunity to share Remote Devices 36 with several different users. Each Computer would have its own CCRS 44 connected to it, and therefore each Computer 10 would "see" a Device Emulation 48. As such, all Computers 10 would be receiving "smooth" data—it is a simple matter of managing which Computer 10 or Computers has(ve) the ability to control the Computer Emulation 50 (and therefore the Remote Device 36).

The reader should certainly understand that another preferred embodiment of the method of the present invention is to place the software (or firmware) routines within the Computer itself, or within the Remote Device itself. In such a way, the routine would still act and perform the same functions as described herein, but would do so while being executed by the Computer or Remote Device themselves.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved system for device communications, comprising:
    at least one computer;
    a device emulation in communication with said computer;
    a computer emulation in communication with said device emulation, wherein said computer emulation is presented to said device by a device-connected remoting system, said device-connected remoting system in communication with at least one computer-connected remoting system, said device emulation presented to said computer by said computer-connected remoting system;
    a remote device in communication with said computer emulation;
    data reading means for reading data transmitted to a said remoting system by said remote device or said computer;
    data grouping means for grouping said read data into groups;
    data packaging means for packaging said groups;
    package transmitting means for transmitting said packaged data to another said remoting system; and
    package receiving means for receiving said packages transmitted by other said remoting systems.

2. The system of claim 1, wherein said remoting systems further comprise processing means for processing said packaged data.

3. The system of claim 2, wherein said remoting systems are in communication with each other over a wide area network communication system.

4. The device of claim 1, wherein:
    said data grouping means groups said read data according to predetermined time periods; and
    said data packaging means packages said groups by compressing said groups.

5. The device of claim 4, wherein said data packaging means packages said groups by encrypting said groups.

6. The device of claim 5, wherein said data packaging means packages said groups by adding an authentication watermark to said group.

7. An improved method for a computer communicating with a remote device, comprising the steps of:

the computer communicating with a device emulation, said device emulation presented by a computer-connected remoting system;

said device emulation communicating with a computer emulation; and the remote device communicating with said computer emulation, said computer emulation presented by a device-connected remoting system.

8. The method of claim 7, wherein said device emulation communicating with said computer emulation step comprises:

said device-connected remoting system grouping, packaging and transmitting data to said computer-connected remoting system; and said computer-connected remoting system receiving said grouped, packaged and transmitted data and responsively processing and transmitting said data to said device emulation.

9. The method of claim 8, wherein said data packaging and transmitting steps are responsive to the quality of said communications between said remoting systems.

10. A device for improving remote interaction between at least one computer and an electronic device, comprising:

means for communicating with said at least one computer;

means for communicating with said electronic device;

computer emulation means for emulating a said computer's communications with the electronic device, said computer emulation means in communication with said electronic device; and device resident driver set means, defined by non-time-dependent responses, time-dependent responses and time-dependent commands said time-dependent commands of the type conventionally residing in a computer-resident driver set means.

11. The device of claim 10, further comprising:

data reading means for reading data transmitted to said device by said electronic device;

data grouping means for grouping said read data into groups;

data packaging means for packaging said groups;

package transmitting means for transmitting said packaged data to another said device; and package receiving means for receiving said packages transmitted by other said devices.

12. The device of claim 11, wherein:

said data packaging means comprises compressing said groups; and said data packaging means comprises encrypting said groups.

13. The device of claim 12, further comprising:

transmission performance sensor means for detecting the quality of transmissions between said devices; and wherein said grouping means and said packaging means are responsive to said transmission performance sensor means.

\* \* \* \* \*